UNITED STATES PATENT OFFICE.

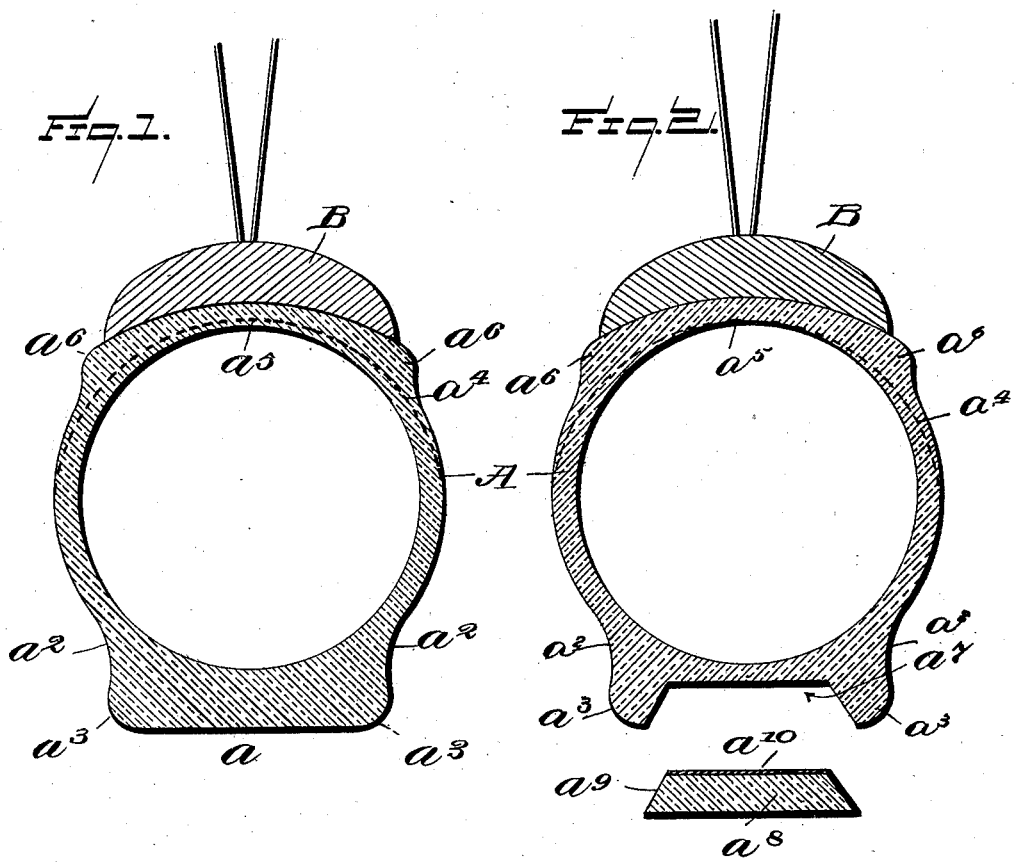

ADAM H. BECK, OF WASHINGTON, DISTRICT OF COLUMBIA; KATE BECK ADMINISTRATRIX OF SAID ADAM H. BECK, DECEASED.

PNEUMATIC TIRE.

SPECIFICATION forming part of Letters Patent No. 671,365, dated April 2, 1901.

Application filed November 8, 1899. Serial No. 736,268. (No model.)

*To all whom it may concern:*

Be it known that I, ADAM H. BECK, a citizen of the United States, residing at Washington, in the District of Columbia, have invented certain new and useful Improvements in Pneumatic Tires; and I do hereby declare the following to be a full, clear, and exact description of the invention, such as will enable others skilled in the art to which it appertains to make and use the same.

The object is to present a thoroughly-efficient, durable, light, highly-resilient, and at once puncture-proof pneumatic tire.

The invention consists of the novel construction of a bicycle-tire, as will be hereinafter fully described and claimed.

Attempts have heretofore been made to render a pneumatic tire puncture-proof by thickening or reinforcing the tread portion, and while such procedure has been effective for the purpose designed, yet it has been accompanied by such loss in the resiliency of the tire as to render it highly objectionable to users and has thus prevented its general adoption. The reasons for the loss of resiliency in a tire thus constructed are two, the first being that generally the tread is formed of a band of hardened rubber either integral with or secured to the tire or a band of some tough fibrous substance, such as leather, and as these adjunctive means do not possess a resiliency equal to that of the tire proper they cannot present the requisite yielding qualities to absorb jars and shocks incident to contact of the tire with obstructions when in use. The second reason is that under pressure the points of greatest yield in the tire are removed from near the tread, where the largest part of the yield should occur, to a point adjacent to the rim or felly, where the beneficial effects of the giving action of the tire are largely reduced and where in time rim-cutting, and thus destruction of the tire, will occur. The cause of this latter objectionable feature is due to the fact that the tire adjacent to the tread and thence to the rim is of greater thickness than the remaining portion of the tire, so that it will be obvious that under pressure the tire will yield at the point of least resistance—that is, closest to the rim.

Under the device of my invention I obviate the objections noted, first, by making the tread of soft rubber, and, second, by incurving the tire adjacent to the tread, so that practically the tire at these points is of substantially the same thickness as the remainder of the tire. Under this latter construction when pressure is applied to the tread the first yield will be adjacent to the tread and thence progressively onward to the rim. As it is inevitable that there will at times be certain attrition between the rim and the tire, and, as stated, this will tend to destroy the tire, I provide the tire on each side, at the points upon which the rim bears, with a reinforcing-strip of rubber, which is so constructed and disposed as not to in any way affect the resiliency of the tire.

In the accompanying drawings, forming a part of the specification, and in which like letters of reference indicate corresponding parts, I have illustrated two forms of embodiment of my invention, it being understood that other forms of embodiment thereof may be employed without departing from the spirit of the same, and in these drawings—

Figure 1 is a view in transverse section of a preferred form of my tire. Fig. 2 is a similar view of a modified form thereof.

Referring to the drawings, A designates the tire, which may be of the single-tube type or one adapted for the employment of an inner tube, as may be preferred, and B the felly or rim. The tire, as usual, is a multi-ply structure—that is to say, constructed of alternate layers of rubber and canvas vulcanized together.

The tire form shown in Fig. 1 is provided with a flat tread portion $a$, of soft rubber and of less width than the tire when inflated, the sides of the tread portion being incurved, as shown at $a^2$, whereby to reduce the thickness of the tire at this point and to obviate stiffness, and thus loss of resiliency, the corners of the tread portion being by preference rounded, as shown at $a^3$, though they may be square or sharp, as preferred. Secured to the inner side of the exterior surface of the tire is a reinforcing-strip $a^4$, the same being very thin at the point $a^5$ and gradually thickening outward to points somewhat removed from those upon which the edges of the rim will bear in use, then somewhat abruptly incurved, forming shoulders $a^6$, and then gradually diminishing in thickness toward the sides of the tire, whereby to cause the tire between the shoulders and the tread to be substantially of the same thickness, the thickest part of the strip $a^4$ by preference being under the edge of the terminals of the rim where greatest attrition, and thus wear, will occur.

The form of tire shown in Fig. 2 is the same as that shown in Fig. 1 except that instead of the tread being solid it is provided with a circumferential groove $a^7$, having outward-diverging walls, in which is fitted a band $a^8$ in the nature of a supplemental tread, having inward-converging walls $a^9$, the object of the arrangement of the walls of the groove and of the supplemental tread being to prevent entrance of a sharp body, as a tack or the like, into the tire proper, as it will be seen that should such object enter the supplemental tread at or adjacent to the meeting edges of the two walls it will have to pass through the same thickness of rubber as it would if the tread were in one piece. The back of the band $a^8$ is provided with a strip of canvas or other textile fabric $a^{10}$ to prevent the band from stretching. Should the band become severed, as by passing over a piece of glass or the like, it may at a small expenditure be replaced, and thus present the tire in practically the same shape as it was when new.

Having thus fully described my invention, what I claim as new, and desire to secure by Letters Patent of the United States, is—

1. A pneumatic tire having a tread portion of soft rubber and of less width than the tire when inflated, the sides of the tread adjacent to the tire being incurved, thereby to cause the tire at these points to be of substantially the same thickness as the body portion of the tire, and a reinforcing-strip secured to the inner side of the exterior surface of the tire, the said strip being thin at the center of that portion of the tire upon which the rim will bear, and gradually thickening outward to points somewhat removed from those upon which the edges of the rim will bear in use, then somewhat abruptly incurved, forming shoulders, and then gradually diminishing in thickness toward the sides of the tire, thereby to cause the tire, between the shoulders and the tread, to be substantially of the same thickness as the thickest part of the reinforcing-strip, substantially as and for the purpose described.

2. A pneumatic tire having a tread portion of soft rubber and of less width than the tire when inflated, the sides of the tread adjacent to the tire being incurved, whereby the tire, at these points is of substantially the same thickness as the body portion, the tread portion being provided with a circumferential groove having outward-diverging walls and a supplemental tread or band of soft rubber, having inward-converging walls adapted to fit within the groove, the back of the supplemental tread or band having attached thereto a strip of textile fabric, whereby to prevent stretching of the said band, substantially as described.

In testimony whereof I affix my signature in the presence of two subscribing witnesses.

ADAM H. BECK.

Witnesses:
E. H. PARRY,
R. M. ELLIOTT.